US006843150B2

(12) United States Patent
Djordjevic

(10) Patent No.: US 6,843,150 B2
(45) Date of Patent: Jan. 18, 2005

(54) PARKING BRAKE ASSEMBLY HAVING QUIET APPLY

(75) Inventor: Nebojsa Djordjevic, Toronto (CA)

(73) Assignee: Atoma International Inc., Newmarket (CA)

( * ) Notice: Subject to any disclaimer, the term of this patent is extended or adjusted under 35 U.S.C. 154(b) by 82 days.

(21) Appl. No.: 10/271,234

(22) Filed: Oct. 14, 2002

(65) Prior Publication Data

US 2003/0084743 A1 May 8, 2003

Related U.S. Application Data

(63) Continuation-in-part of application No. 09/693,306, filed on Oct. 20, 2000, now abandoned.
(60) Provisional application No. 60/160,857, filed on Oct. 21, 1999.

(51) Int. Cl.[7] .................................................. G05G 5/06
(52) U.S. Cl. .......................................... 74/523; 74/502.2
(58) Field of Search ............................... 74/502.2, 519, 74/523, 526, 533, 535, 537, 531

(56) References Cited

U.S. PATENT DOCUMENTS 4,138,905 A * 2/1979 Konishi ..................... 74/577 R
5,247,850 A * 9/1993 Lenzke ......................... 74/523
5,448,928 A * 9/1995 Harger ......................... 74/523
5,509,326 A * 4/1996 Belmond ..................... 74/523
5,609,066 A * 3/1997 Bunker et al. ................ 74/537
5,950,496 A * 9/1999 Rampp ......................... 74/538

* cited by examiner

Primary Examiner—David A. Bucci
Assistant Examiner—Vicky A. Johnson
(74) Attorney, Agent, or Firm—Clark Hill PLC

(57) ABSTRACT

A parking brake assembly for a vehicle has a mounting bracket, a handle assembly and a clutching mechanism. The mounting bracket has a stop. The handle assembly is pivotally mounted on the mounting bracket for rotation about a first axis. The handle is moveable between a brake applied position and a brake release position. The handle has an actuator. A cam is pivotally mounted on the handle about a second axis offset from the first axis. The cam has a cam surface which varies radially from the second axis. The cam is biased to engage the stop. A clutch spring frictionally engages the cam and is operably connected to the actuator. Movement of the actuator in response to manual manipulation responsively moves the clutch spring to decrease the frictional engagement, thereby enabling the cam to engage with the stop. In response to releasing the actuator, the clutch spring moves to increase frictional engagement with the cam thereby retaining the cam in a position to engage the stop and prop the handle in a braking position.

12 Claims, 3 Drawing Sheets

PARKING BRAKE ASSEMBLY HAVING QUIET APPLY

RELATED APPLICATIONS

This application is a continuation-in-part of U.S. patent application Ser. No. 09/693,306, filed on Oct. 20, 2000, now abandoned, which claims the benefit and priority under 35 USC 119(e) of U.S. Provisional Application No. 60/160,857, filed on Oct. 21, 1999.

FIELD OF THE INVENTION

The present invention relates to parking brakes for vehicles. In particular, this invention relates to parking brakes having quiet apply.

BACKGROUND OF THE INVENTION

Conventional parking brakes have a ratchet and pawl arrangement for securing a parking brake in a locked position. The parking brake handle can be lifted towards the locked position, however it cannot be lowered without disengaging the ratchet and the pawl. A primary disadvantage of conventional brakes is that when the parking brake handle is lifted, the pawl is dragged across the teeth of the ratchet. This action creates a loud noise, which is in some cases undesirable.

In order to remove this noise, quiet apply parking brakes have been introduced. The quiet apply systems that are currently available tend to be complex and thus expensive to make and assemble. Therefore, it is desirable to have a quiet apply parking brake that is simple and effective.

SUMMARY OF THE INVENTION

The disadvantage of the prior art may be overcome by providing a parking brake assembly for a vehicle having a quiet apply.

According to one aspect of the invention, there is provided a parking brake for a vehicle. The parking brake has a mounting bracket having a stop. A handle assembly is pivotally mounted on the mounting bracket for rotation about a first axis between a brake release position to a brake applied position. A cam is pivotally mounted on the handle about a second axis offset from the first axis. The cam is biased to engage the stop. An actuator is operably connected to a clutch and the clutch frictionally engages the cam for selectively retaining the cam relative to the handle. Movement of the actuator responsively moves the clutch to release the cam enabling the cam to move relative to the handle. In response to releasing the actuator, the clutch retains the cam relative to the handle to prop the handle in a position between the brake release position and the brake applied position.

According to another aspect of the invention, there is provided a parking brake having a mounting bracket, a handle assembly and a locking mechanism. The mounting bracket has a stop. The handle assembly is pivotally mounted on the mounting bracket for rotation about a first axis. The handle is moveable between a brake applied position and a brake release position. The handle has an actuator. The locking mechanism has a cam pivotally mounted on the handle about a second axis offset from the first axis. The cam has a cam surface which varies radially from the second axis. The cam is biased to engage the stop. A clutch spring frictionally engages the cam and is operably connected to the actuator. Movement of the actuator in response to manual manipulation in a first direction responsively moves the clutch spring to decrease the frictional engagement, thereby enabling the cam to engage with the stop. In response to releasing the actuator, the clutch spring moves to increase frictional engagement with the cam thereby retaining the cam in a position to engage the stop.

DETAILED DESCRIPTION OF A PREFERRED EMBODIMENT

Figure 1:
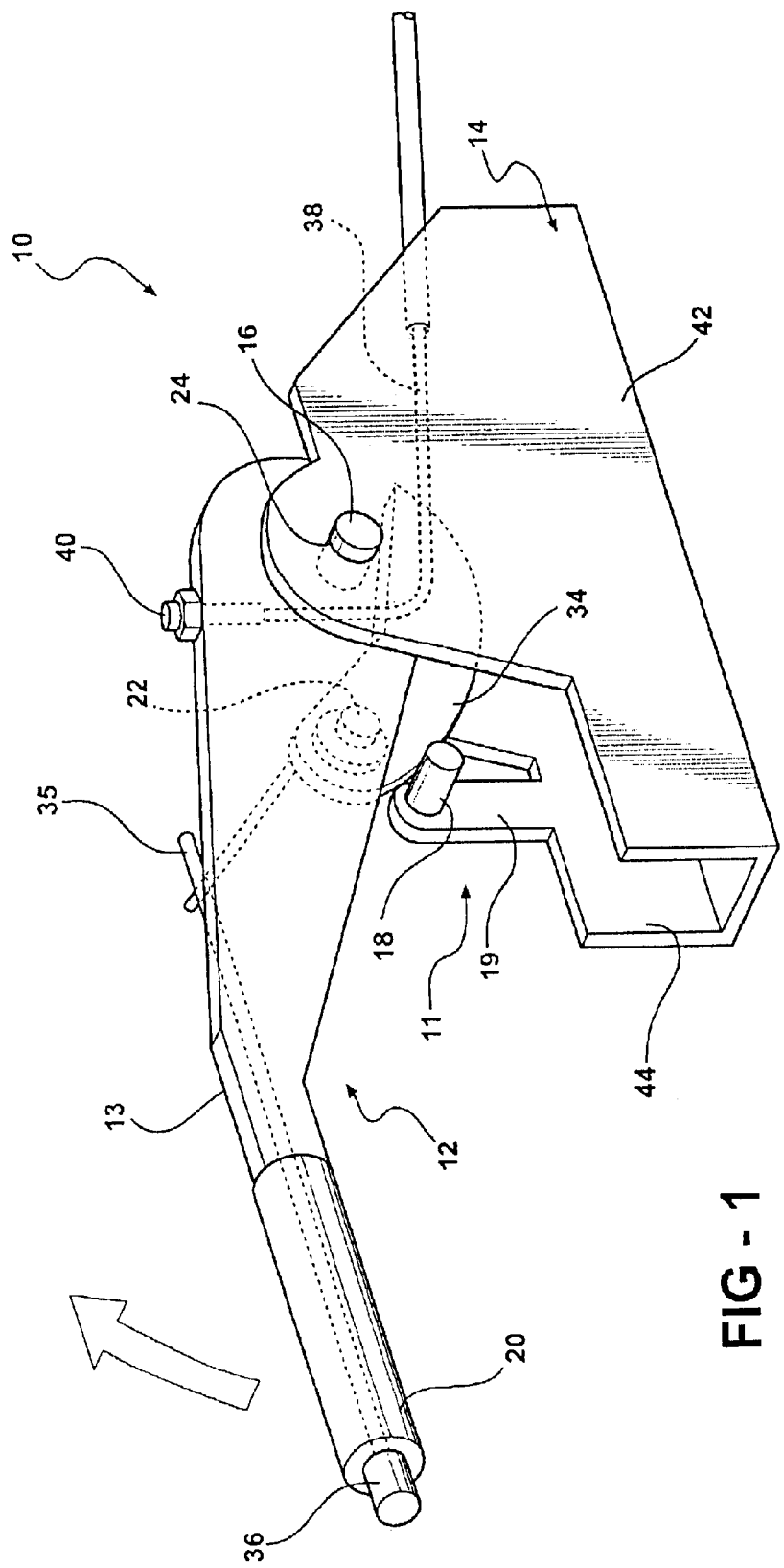
FIG. 1 is a perspective view of the parking brake assembly of the present invention in an unlocked position.

Referring to FIG. 1, a parking brake assembly 10 of the present invention is shown. The parking brake assembly 10 generally comprises a handle assembly 12, a mounting bracket 14 and a locking mechanism 11.

The mounting bracket 14 is a U-channel member having a longitudinal extent having upwardly extending walls 42 and 44. Cylindrical shaft 16 extends through apertures 24 in walls 42 and 44. An arm 19 extends coplanar with one of the walls 42, 44 and is offset longitudinally from shaft 16. Arm 19 supports a stop 18 that extends at least partly between the walls 42, 44 and is generally perpendicular to the walls 42, 44. Mounting bracket 14 is configured to attach to a vehicle (not shown) in any conventional manner.

Figure 2:
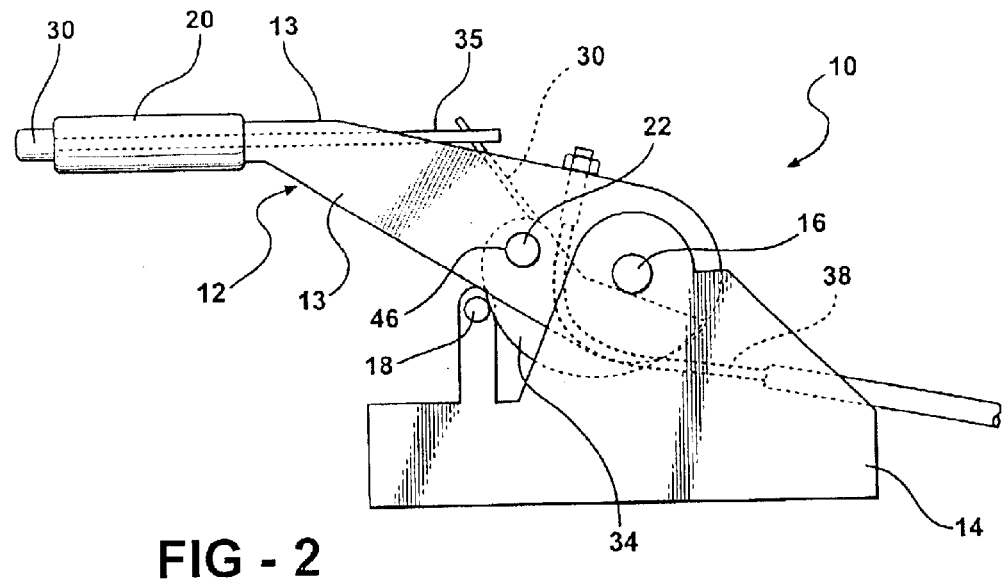
FIG. 2 is a side elevational view of the parking brake assembly of FIG. 1 in an unlocked position.
Figure 3:
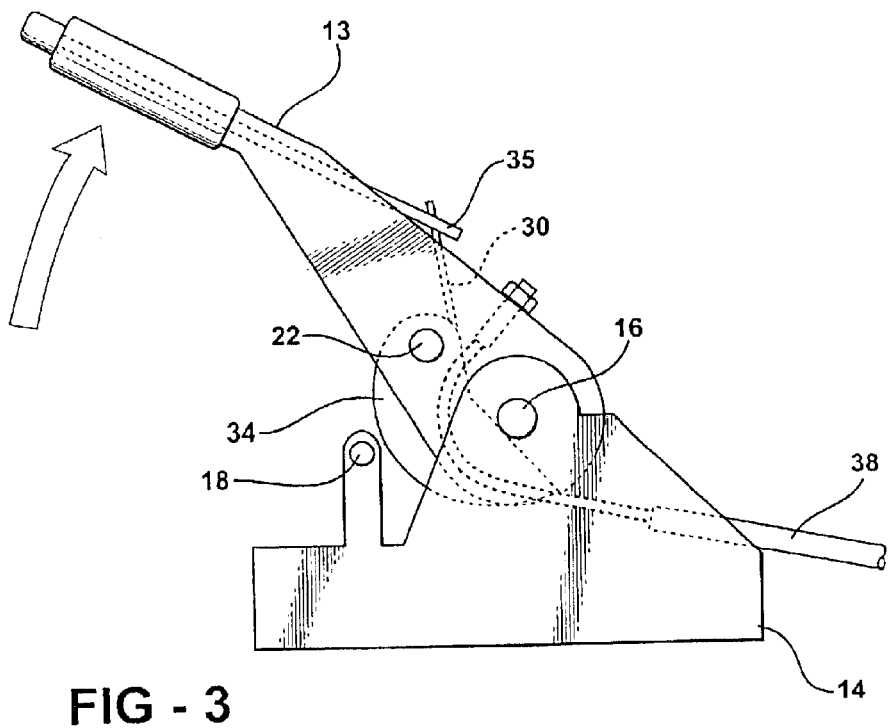
FIG. 3 is a side elevational view of the parking brake assembly of FIG. 1 in a brake applied position.
Figure 4:
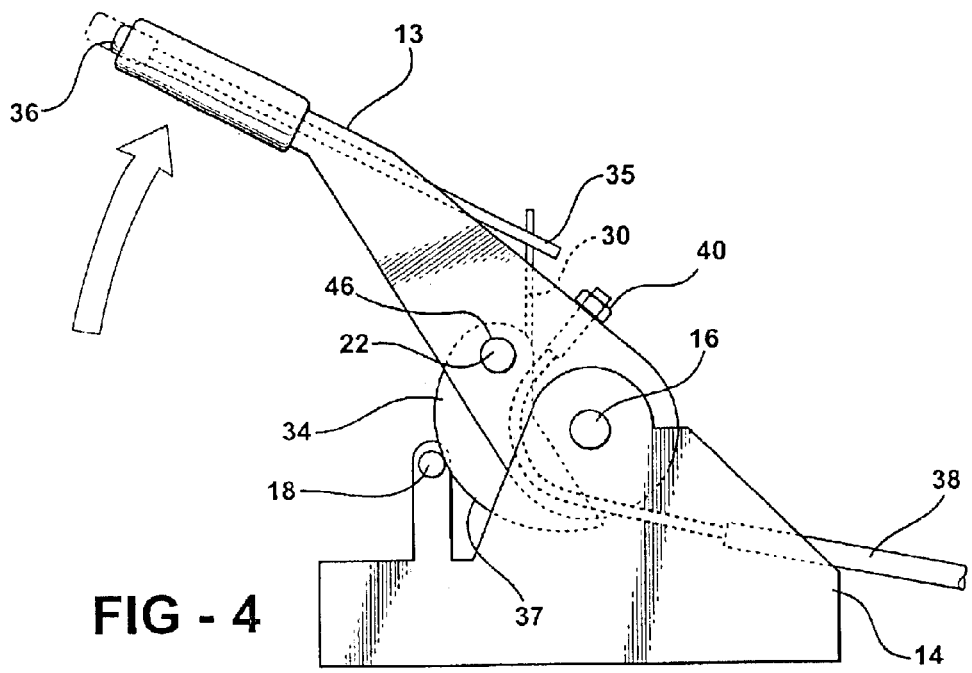
FIG. 4 is a side elevational view of the parking brake assembly of FIG. 1 in a locked position.

Referring to FIG. 2, handle assembly 12 comprises an elongate arm 13 with a grip 20. Handle assembly 12 is pivotally mounted on shaft 16 at one end region thereof. Shaft 16 defines a first axis of rotation and allows the arm 13 to rotate between a brake release position (FIG. 2) and a brake applied position (FIGS. 3 and 4). Arm 13 is typically made of stamped metal and has an inverted U-channel at the base portion. Handle assembly 12 has a biased button 36 slidably mounted in the distal end of arm 13 remote from the shaft 16.

Locking or clutching mechanism 11 generally comprises a pivot pin 22, a rod 35, a clutch spring 30, a second spring 32 and a cam 34. Pivot pin 22 extends through apertures 46 in arm 13 so that pin 22 is spaced from shaft 16, defining a second axis of rotation. The cam 34 is fixedly mounted on the pivot pin 22. The cam 34 is seated forward and partially below the shaft 16 so as to not interfere with the pivoting of the handle assembly 12.

Rod 35 extends between the actuator or button 36 and clutch spring 30 to transmit movement of button 36 to the locking mechanism 11.

Figure 6:
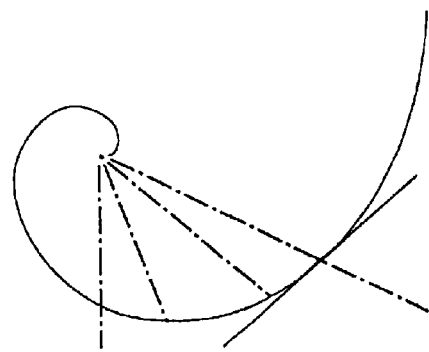
FIG. 6 is a schematic diagram representing the motion of the locking cam of the parking brake assembly of FIG. 1.

Cam 34 has a cam surface 37 on the peripheral extent thereof. The outline of the cam surface 37 has a varying radial extent from the second axis of rotation, the preferable shape being of an Archimedes spiral as shown in FIG. 6. The cam 34 has an arcuate cable guide (not illustrated).

Figure 5:
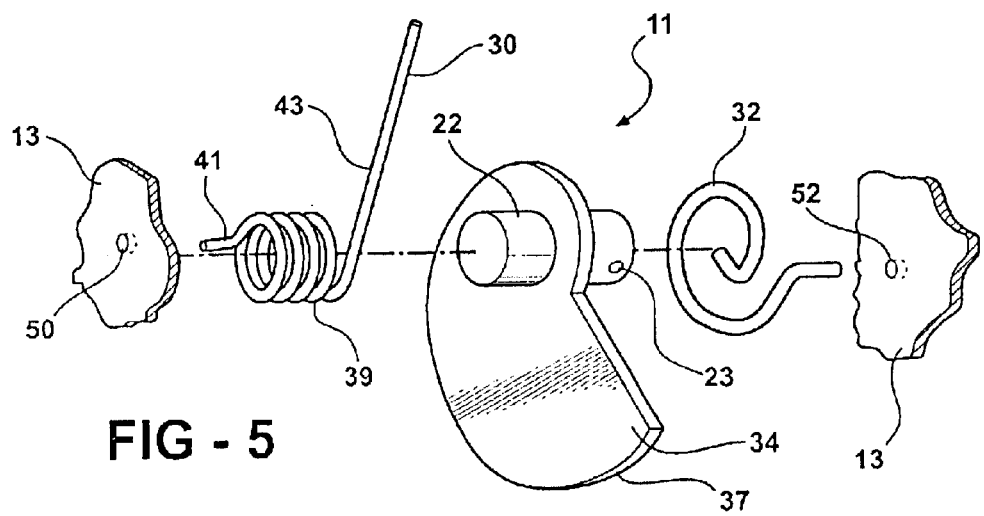
FIG. 5 is a partial exploded perspective view of the locking assembly of the parking brake assembly of FIG. 1.

Referring to FIG. 5, the clutch spring 30 has a coiled section 39 terminating in a tanged end 41 and a tail 43.

Coiled section 39 surrounds pivot pin 22. Tanged end engages arm 13 at aperture 50. The tail 43 extends outwardly to interconnect with rod 35. The coiled section 39 has an inner diameter which approximates the diameter of pin 22. In a relaxed condition, the coiled section 39 will frictionally engage the pin 22 sufficiently to hold the pivot pin 22 in place. When the tail 43 is moved in an unwinding sense relative to the coiled section 39, the coiled section 39 expands releasing the frictional engagement between the coiled section 39 and the pivot pin 22.

Second spring 32 extends between pivot pin 22 at aperture 23 and the arm 13 at aperture 52. Spring 32 is shaped to engage apertures 23 and 52 at opposite ends thereof. Spring 32 biases the cam 34 to rotate in the locking direction to engage the cam surface 37 with the stop 18.

Referring to FIG. 4, a Bowden cable 38 wraps around the arcuate cable guide and attaches to the arm 13 by a fastener 40. As the arm 13 is rotated in a braking sense from the brake release position to the brake applied position, upward in the Figures, the arm 13 pulls on the cable 38 to effect a braking event at the opposite end. As the arm 13 is rotated in a releasing sense, opposite the braking sense, the arm 13 releases tension on the cable 38 to release the braking event.

Now that the apparatus has been described, the mode of operation of the device will now be described.

Referring to FIG. 2, the parking brake assembly 10 is shown in the brake released position. When the handle assembly 12 is rotated to a brake applied position without pressing button 36, the cable 38 is pulled and the brake of the vehicle is activated in a manner well known in the art. However, since the locking mechanism 11 has not been released, the cam 34 will not rotate relative to the handle 12 to engage stop 18. That is, the cam 34 will stays fixed relative to the handle 12 and orbit around the shaft 16 with the handle 12, but the cam surface 37 will remain spaced from the stop 18 as shown in FIG. 3. As a result, the handle assembly 12 will be free to counter rotate back to the brake release position under the influence of the bias of the brake rotors or calipers.

This particular mode is useful for a vehicle having a mechanical clutch. If the vehicle is stopped on an incline, a driver merely lifts on the handle 13 which engages the brakes. The driver is able to move the right foot from the brake pedal to the accelerator pedal without rolling backwards. Once the clutch is released to start engaging, the driver releases the handle 13 which immediately retracts to the brake release position, disengaging the brakes allowing the vehicle to proceed up the incline.

Referring to FIG. 4, once the button 36 is pressed in response to manual manipulation, rod 35 transmits this movement to the clutch spring 30. The clutch spring 30 responsively rotates in an unwinding sense, releasing the frictional engagement on pivot pin 22 allowing the cam 34 to rotate relative to the handle 12 under the influence of spring 32. Cam 34 rotates in a locking direction causing engagement between the cam surface 37 and the stop 18. Once the button 36 is released, the clutch spring 30 counter rotates in a winding sense to re-establish the frictional or gripping engagement with pivot pin 22. Once the handle assembly 12 is released, the engagement of the cam 34 with the stop 18 will support or prop the handle 13 which will remain in the rotated or brake applied position maintaining tension on cable 38 and thus maintaining the braking condition.

To unlock the handle assembly 12, button 36 is pressed and held while the handle assembly 12 is counter rotated from the brake applied position to the brake release position. Pressing button 36 actuates rod 35 which rotates the clutch spring 30 in an unwinding sense so that the clutch spring 30 releases its grip on pivot pin 22. As the arm 13 is counter rotated, the engagement with the stop 18 will urge the cam 34 to return to its original position. The bias of second spring 32 is easily overcome by either the driver or the bias of the brake drums or calipers. Once the handle assembly 12 is fully rotated to the brake release position, the button 36 is released, re-establishing the frictional engagement between the clutch spring 30 and the cam 34.

Parking brakes of this type may be used on any type of vehicle. This would include golf carts and the like and any other type of vehicle that would benefit from having a parking brake.

Although the invention has been described with reference to certain specific embodiments, various modifications thereof will be apparent to those skilled in the art without departing from the scope of the invention as outlined in the claims appended hereto.

I claim:

1. A parking brake for a vehicle comprising:

a mounting bracket having a stop;

a handle assembly pivotally mounted on said mounting bracket for rotation about a first axis between a brake release position and a brake applied position;

a cam pivotally mounted on said handle about a second axis offset from said first axis, said cam biased to engage said stop, said cam having a cam surface having a varying radial extent from said second axis;

an actuator operably connected to a clutch, said clutch frictionally engaging said cam for selectively retaining said cam relative to said handle;

wherein movement of said actuator responsively moves said clutch to release the cam enabling said cam to move relative to the handle, and in response to releasing said actuator, said clutch retains said cam relative to said handle to prop said handle in a position between the brake release position and the brake applied position.

2. A parking brake as claimed in claim 1 wherein said clutch is a coil spring engaging said cam.

3. A parking brake as claimed in claim 2 wherein said cam includes a pivot pin and said coil spring is wound about said pivot pin.

4. A parking brake as claimed in claim 1 wherein said cam surface is a spiral shape.

5. A parking brake as claimed in claim 1 wherein said cam surface is an Archimedes spiral.

6. A parking brake as claimed in claim 1 wherein said handle has a pivot pin for pivotally mounting the handle to the mounting bracket and said actuator is slidably mounted in an end of the handle remote from said pivot pin.

7. A parking brake as claimed in claim 6 wherein said clutch is a coil spring engaging said cam and said actuator further comprises a rod engaging said coil spring.

8. A parking brake as claimed in claim 7 wherein said actuator is a button.

9. A parking brake as claimed in claim 8 wherein said cam has a cam surface having a varying radial extent from said second axis.

10. A parking brake as claimed in claim 9 wherein said cam includes a pivot pin and said coil spring is wound about said pivot pin.

11. A parking brake as claimed in claim 10 wherein said cam surface is a spiral shape.

12. A parking brake as claimed in claim 10 wherein said cam surface is an Archimedes spiral.

* * * * *